(12) United States Patent
Gollehur et al.

(10) Patent No.: US 7,625,037 B2
(45) Date of Patent: Dec. 1, 2009

(54) VEHICLE BODY PANEL ACCESS FEATURE

(75) Inventors: Robert J. Gollehur, Macomb Township, MI (US); Stephen H. Miller, South Lyon, MI (US); Marcel R. Cannon, Romeo, MI (US); John T. Freiwald, Clarkston, MI (US); Steven P. Balgaard, Fenton, MI (US); Charles E. Jensen, Macomb, MI (US); Anthony J. Brower, Oxford, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 437 days.

(21) Appl. No.: 11/230,439

(22) Filed: Sep. 20, 2005

(65) Prior Publication Data

US 2007/0063547 A1    Mar. 22, 2007

(51) Int. Cl.
*B62D 25/20* (2006.01)
(52) U.S. Cl. .................................. 296/193.07
(58) Field of Classification Search ............ 296/193.07, 296/204; 180/69.4, 69.24; 83/33, 862, 863, 83/864
See application file for complete search history.

(56) References Cited

U.S. PATENT DOCUMENTS

| | | | | |
|---|---|---|---|---|
| 1,782,817 A | * | 11/1930 | Grimm | 296/193.07 |
| 2,144,982 A | * | 1/1939 | Jones | 296/193.07 |
| 3,614,078 A | * | 10/1971 | Hepler | 266/56 |
| 3,791,034 A | * | 2/1974 | Carver | 30/367 |
| 4,326,445 A | * | 4/1982 | Bemiss | 89/36.08 |
| 4,664,209 A | * | 5/1987 | Felker | 180/90.6 |
| 4,729,156 A | * | 3/1988 | Norris et al. | 29/401.1 |
| 5,338,138 A | * | 8/1994 | Pavur et al. | 411/107 |
| 5,992,926 A | * | 11/1999 | Christofaro et al. | 296/204 |
| 6,102,469 A | * | 8/2000 | Shambeau et al. | 296/184.1 |
| 6,619,337 B1 | * | 9/2003 | Vickers | 141/98 |
| 2005/0285432 A1 | * | 12/2005 | Sugihara et al. | 296/193.07 |
| 2006/0022004 A1 | * | 2/2006 | Mazzone | 224/311 |
| 2006/0197361 A1 | * | 9/2006 | Ito et al. | 296/193.07 |

FOREIGN PATENT DOCUMENTS

DE    10332773 A1 * 11/2004
GB    2 118 909 A * 11/1983

\* cited by examiner

*Primary Examiner*—H Gutman

(57) ABSTRACT

The invention concerns a vehicle body panel. The vehicle body panel, such as a floor pan, may have a generally planar portion adapted to be located adjacent to and conceal a vehicle component, such as a fuel pump module. An access portion is located within and extends out of plane of the generally planar portion, and includes a periphery, wherein the access portion is integral with the generally planar portion. Also, a cutting guide feature extends around it adjacent to the periphery.

17 Claims, 2 Drawing Sheets

VEHICLE BODY PANEL ACCESS FEATURE

BACKGROUND OF INVENTION

The present invention relates generally to a vehicle having a body panel with an access feature located therein that provides a guide for accessing a vehicle component located behind the body panel.

Many automotive vehicles have components that are mounted behind various body panels. Some of these components may be difficult to access for purposes of repair or replacement. In many instances, this is not a significant concern since it may be typically only a small percentage of vehicles where the particular component will require repair or replacement. Moreover, the difficulty of accessing the particular component may be only minor. For others, however, it may be particularly difficult and require a significant amount of time to access and remove the particular component, which can significantly add to the repair cost for that component.

For example, many vehicles have fuel tanks mounted under the floor pan of the vehicle, with a fuel pump module mounted therein and accessible from the top of the fuel tank. For such vehicles, access to the fuel pump module for repair or replacement requires that the fuel tank be partially or fully removed from the vehicle. The removal of the fuel tank, in turn, may require that other vehicle components be removed in order to access the fuel tank—such as suspension and exhaust components. This may be particularly true for vehicles employing rear wheel drive and those employing saddle tanks. The significant amount of extra time required to remove the fuel tank and other components can add significantly to the cost of repairing or replacing a fuel pump module.

In order to avoid this cost and the complications associated with repairing such difficult to access components, some vehicle models include an access hole through the body panel in all of the vehicles, with a cover plate mounted over the hole during vehicle assembly in the plant. In this way, access for repair is simply a matter of removing the cover plate, which greatly simplifies the repair and accordingly minimizes for cost of the repair as well. But this approach incurs an up-front cost for every vehicle, even though the vast majority of these vehicles will never require access to the fuel pump module for purposes of repair or replacement.

Another option may be to design the fuel tank and fuel pump module so that the fuel pump module is more easily accessible for repair. But this may be cost prohibitive or impractical for certain vehicles given the particular location and packaging of the fuel tank in that vehicle.

It is desirable, therefore, to provide a means for relatively quickly and easily accessing a component mounted behind a vehicle body panel, such as a fuel module that is mounted under the vehicle underbody, while also avoiding the drawbacks of the prior art.

SUMMARY OF INVENTION

An embodiment of the present invention contemplates a vehicle body panel. The vehicle body panel may include a generally planar portion adapted to be located adjacent to and conceal a portion of a vehicle component; an access portion, located within and extending out of plane of the generally planar portion, and including a periphery, wherein the access portion is integral with the generally planar portion; and a cutting guide feature that extends around and is adjacent to the periphery.

An embodiment according to the present invention may also contemplate a floor pan of a vehicle. The floor pan may include an access feature, integral with the floor pan, extending out of plane of the floor pan, and including a periphery, wherein the access feature is adapted to be located above and to conceal a fuel pump module; and a cutting guide feature that extends around and is adjacent to the periphery.

An advantage of an embodiment of the present invention is that the initial costs for fabricating the components and assembling the vehicles will be reduced, since there is no separate access cover that must be assembled to every vehicle produced. Yet, for the small percentage of vehicles that require fuel pump module access for servicing, the overall cost for this service can be less when compared to vehicles where the fuel tank (and components in the way) must be removed in order to gain access to the fuel pump module.

Another advantage of an embodiment of the present invention is that the access portion, being out of plane with the rest of the body panel around it, will help keep the body panel stable in this area while the fuel pump module is being serviced.

An additional advantage of an embodiment of the present invention is that the cutting guide feature allows for relatively quick and accurate cuts at the appropriate location and size for accessing the particular vehicle component for repair or replacement.

Yet another advantage of the present invention is that fastener location markings may be provided that correspond with mounting holes in an access hole cover in order to quickly and easily complete the repair by covering the access hole that had been previously cut into the body panel.

DETAILED DESCRIPTION

Figure 1:
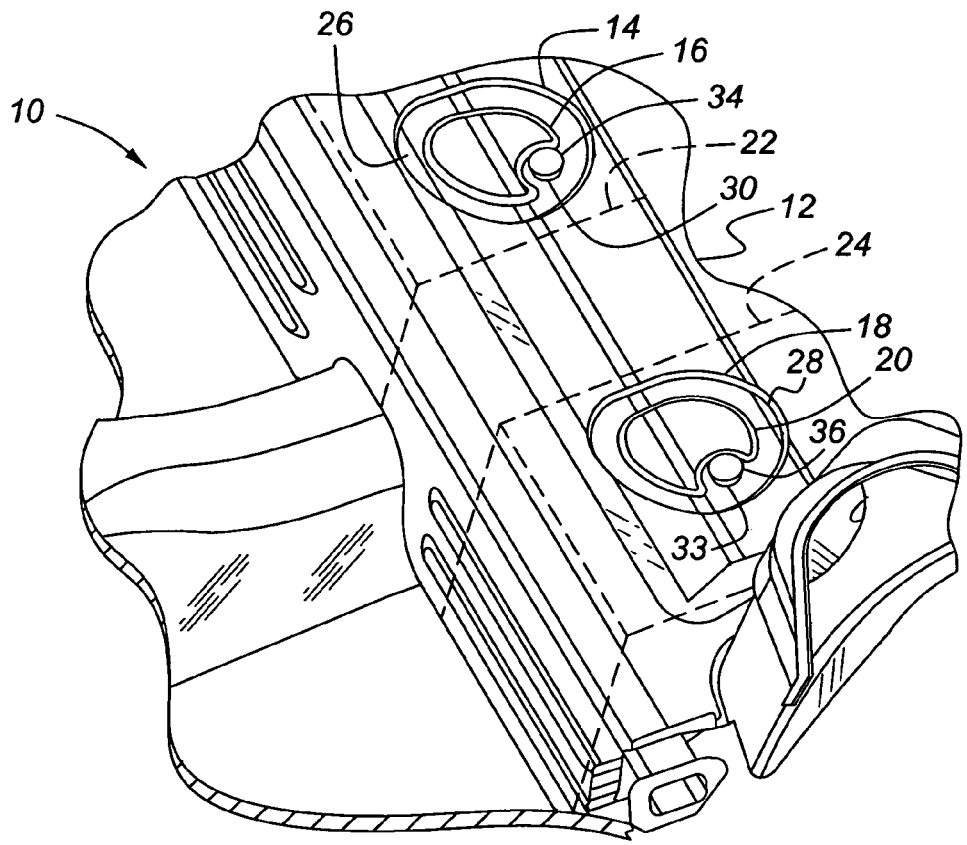
FIG. 1 is a perspective view of a portion of an underbody panel of a vehicle in accordance with a first embodiment of the present invention.

FIG. 1 shows a portion of a vehicle, indicated generally at 10, including a body panel 12, such as a floor pan (also referred to as the underbody). The body panel 12 is typically stamped sheet metal that is welded to other body panels in the vehicle 10. The body panel 12 includes a first generally planar portion 14, within which is located a first access feature (portion) 16. The first access feature 16 is preferably a stamped feature formed during the stamping of the body panel 12 itself. The body panel 12 also includes a second generally planar portion 18, within which is located a second access feature (portion) 20. As with the first access feature 16, the second access feature 20 is preferably a stamped feature formed during the stamping of the body panel 12 itself.

This embodiment shows a vehicle having two access features 16, 20, but other numbers of access features may be employed as needed for access to repair or replace various concealed vehicle components in a particular vehicle. In the example of this embodiment, the two access features 16, 20 may be located for access to two vehicle components such as two separate fuel pump modules (not shown) in a vehicle having saddle tanks, with a first fuel tank 22 under the first access feature 16 and a second fuel tank 24 under the second access feature 20.

Accordingly, while the body panel 12 shown in FIG. 1 forms a generally flat horizontal surface at the location of the access features 16, 20, it may be a vertical or angled surface of a body panel and maybe only generally planar, depending upon the location of the particular vehicle component to which one needs access for repair or replacement. When the term "generally planar" is used herein, then, it includes surfaces such as that shown in FIG. 1, which has one or two small bends extending through the access features 16, 20, or it may have somewhat of a curved surface or other angled feature—as long as it is flat enough to allow for cutout of the particular access portion and mounting of a cover over the opening should the vehicle component underneath need servicing.

The first and second access features 16, 20 are integral parts of the first and second generally planar portions 14, 18 of the body panel 12 and remain intact during forming and vehicle assembly. The term "integral", as used herein, means that the particular feature (portion) is made from the same piece of material as the area around it, forming a single monolithic part, rather than being formed separately first and then later attached by fasteners, welding, adhesive, etc.

The first and second access features 16, 20 are preferably stamped with the forming of the body panel 12, and are out of plane with the first and second generally planar portions 14, 18 around them. That is, each access feature is either raised out of (above) or depressed into (below) the surface of the surrounding generally planar portion. In this first embodiment, both access features 16, 20 are raised above their respective generally planar portions 14, 18. The generally planar portions 14, 18 are recessed below the body panel 12, although they can be flush with the body panel 12 if so desired. The height that first and second access features 16, 20 are raised may be, for example, about ten millimeters. Being out of plane helps to stiffen the panel around these access features 16, 20 should the need arise to cut an access hole for servicing of the fuel pump modules, and this also provides an easy visual reference for the mechanic to locate the access features 16, 20 when service is needed.

Since, in this embodiment, both the generally planar portions 14, 18, and the access features 16, 20 are out of plane with the areas adjacent to them, they, in effect, form first and second cutting guide features 26, 28, respectively. That is, they form ribs which can help to guide a cutting tool that would be used to cut one or both of the access features 16, 20 out of the body panel 12 should service on any fuel pump module be required. Alternatively, cutting guide features, such as those shown in FIG. 2, may be stamped or marked on each of the access features 16, 20 and used as guides for assisting a service technician in cutting an access hole the correct size and at the correct location for easily accessing the particular fuel pump module.

Each of the access features 16, 20 may also include a starter hole 30, 33 respectively, extending through the body panel 12, with a plug 34, 36, respectively, mounted in its corresponding starter hole 30, 33. The plugs 34, 36 can be drain plugs, and are preferably mounted during vehicle assembly. The particular plug 34 or 36 would only need to be removed if the need arises for fuel pump service. With the particular plug 34 or 36 removed, the corresponding starter hole 30 or 33 is available to provide an easy starting point for a cutting tool used to cut out the corresponding access feature 16 or 20. Accordingly, the starter holes 30, 33 will be relatively small compared to the size of the access features 16, 20. Alternatively, the starter holes 30, 33 may be eliminated, in which case, should servicing be required, a starter hole may be drilled prior to cutting out the particular access feature 16 or 20.

Figure 2:
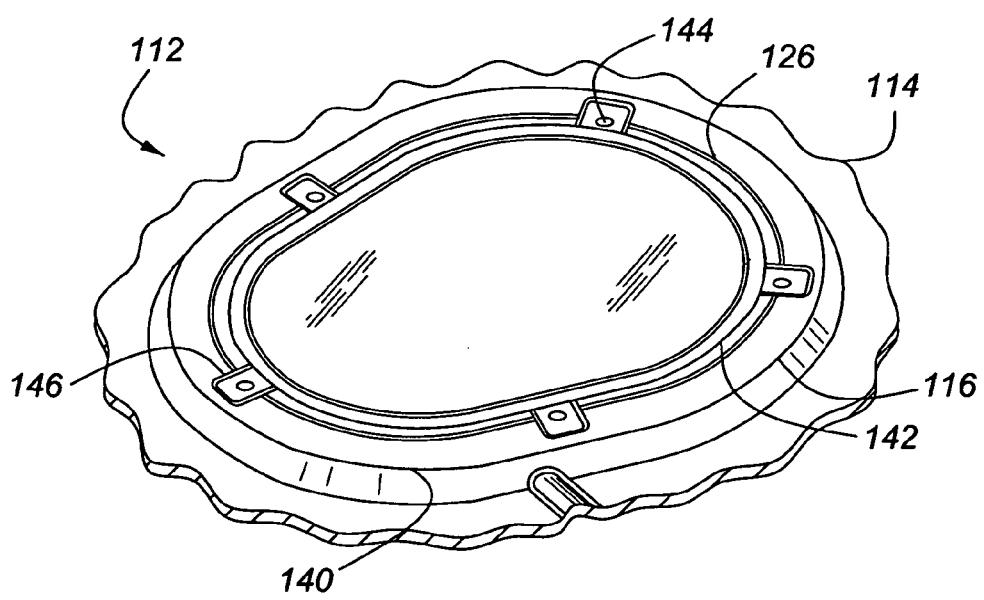
FIG. 2 is a perspective view of a portion of a body panel of a vehicle in accordance with a second embodiment of the present invention.
Figure 3:
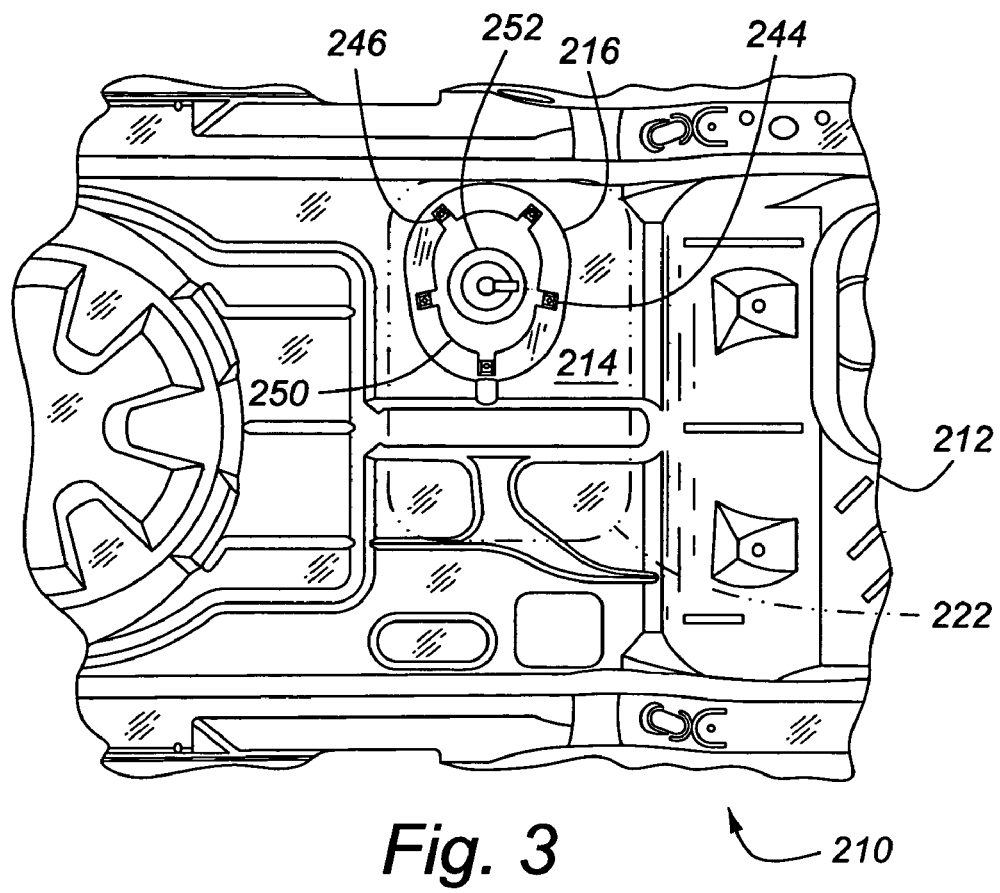
FIG. 3 is a bottom plan view of a portion of an underbody panel of a vehicle in accordance with a third embodiment of the present invention.

In addition, while not illustrated in the embodiment of FIG. 1, fastener location markings and flat spot features, as shown and discussed relative to the embodiments of FIGS. 2 and 3, may be employed in this first embodiment as well.

FIG. 2 illustrates a second embodiment of the present invention. In this embodiment, elements similar to those in the first embodiment will be similarly designated, but with 100-series numbers. A body panel, indicated generally at 112, includes a generally planar portion 114, with an access feature 116 raised out of plane (above the surface) of it. As with the first embodiment, the access feature 116 is integral with the generally planar portion 114 of the body panel 112 and conceals a vehicle component (not shown).

Extending around a periphery 140 of the access feature 116 is a cutting guide feature 126. The cutting guide feature 126 may be stamped into the access feature 116 to form ribs or may be markings on the surface. It may also include a cutting line 142 between the ribs to provide better guidance for the service technician when cutting out the access feature 116 during service operations. Five fastener location markings 144 are spaced about the periphery 140 of the access feature 116. The fastener location markings 144 may be formed features, such as dimples recesses into the surface, or alternatively, may be visual markings made on the surface. Also, flat spot features 146 may be formed at the locations of the fastener location markings 144, with the fastener location markings 144 generally centered on the flat spot features 146. Optionally, this embodiment may also include a starter hole and plug (not shown) at a location along the cutting guide feature 126, similar to that shown in FIG. 1, if so desired.

FIG. 3 illustrates a third embodiment of the present invention. In this embodiment, elements similar to those in the first or second embodiment will be similarly designated, but with 200-series numbers. A vehicle, indicated generally at 210 includes a body panel 212 (in this embodiment a floor pan). The body panel 212 includes a generally planar portion 214, with an access feature 216 depressed into it (below the surface, as seen looking up at the bottom of the body panel 12). As with the first embodiment, the access feature 216 is formed integral with the generally planar portion 214 of the body panel 212. In this embodiment, the body panel 212 is shown with a fuel access pass through hole 250, which is created after cutting out a portion of the access feature 216 for servicing a vehicle component. The vehicle component may be a fuel pump module (also called modular reservoir assembly or fuel sender) 252 mounted in a fuel tank 222 (shown in phantom). The access feature 216 also includes the fastener location markings 244 and flat spot features 246, as discussed above relative to the second embodiment.

Figure 4:
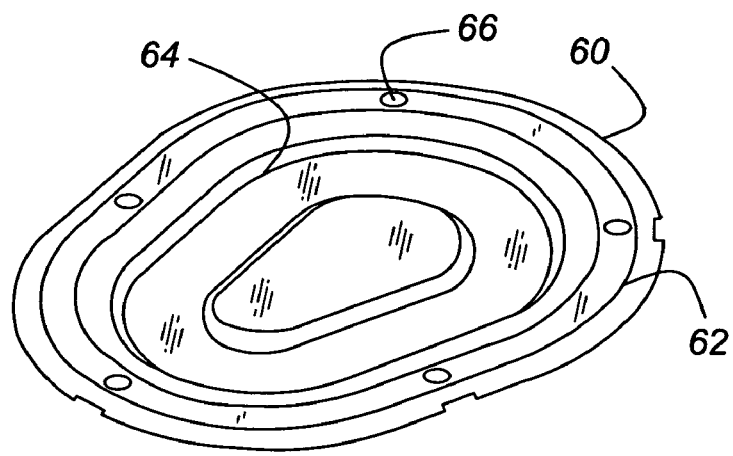
FIG. 4 is a perspective view of an access hole cover that may be employed with the second and third embodiments of the present invention.

FIG. 4 illustrates an access hole cover 60 that may be employed with the second and third embodiments of the present invention. The access hole cover (also called a cover plate) 60 may be part of a service kit that includes fasteners (not shown), which optionally may be self piercing, sealer (not shown), adhesive (not shown) and/or a shouldered drill bit (not shown). The hole cover 60 may include an outer mounting portion 62 that is sized and shaped to mate with an access feature around an access pass through hole, and a central portion 64 that will cover the access pass through hole. The outer mounting portion 62 has fastener holes 66 spaced to align with corresponding fastener location markings on the access feature. This makes properly aligning the cover 60 prior to securing it in place with fasteners (not shown) relatively easy.

For vehicles that do not require service to the particular vehicle component, and hence do not have an access pass through hole cut out of the body panel, the cover 60 is not employed. Consequently, an overall cost savings can be realized since only a small percentage of vehicles will ever employ the access hole cover 60.

Should service for the particular concealed vehicle component be required, a cutting tool can be used to cut an access pass through hole out of the floor pan. The cutting tool may be for example an air nibbler, which is a spark-free tool that cuts metal using a reciprocating punch feature. If a starter hole is present, then the technician may use this as an easy starting point for the cut after removing the plug. If not, a starter hole can be drilled to provide a convenient starting location for the cut. The technician can then easily access the component for servicing. After service of the component, a cover, such as that shown in FIG. 4, can be used to cover the hole. A shouldered drill bit (not shown) can be included as part of the cover service kit in order to provide guidance for the proper depth of drill through the fastener location markings.

While certain embodiments of the present invention have been described in detail, those familiar with the art to which this invention relates will recognize various alternative designs and embodiments for practicing the invention as defined by the following claims.

What is claimed is:

1. A vehicle body panel comprising:
a generally planar portion adapted to be located adjacent to and conceal a portion of a vehicle component;
an access portion, located within and extending out of plane of the generally planar portion, and including a periphery, wherein the access portion is integral with the generally planar portion; and
a cutting guide feature that extends around and is adjacent to the periphery and is a visual reference that indicates where a hole can be later cut in the body panel for access to service the vehicle component.

2. The body panel of claim 1 wherein the cutting guide feature is a marking on the access portion.

3. The body panel of claim 1 wherein the vehicle component is a fuel pump module and the access portion is configured to be large enough to receive the fuel pump module therethrough.

4. The body panel of claim 1 further including a plurality of fastener location markings spaced around the access portion and being a visual reference that indicates where a plurality of fasteners of a cover would later align with the vehicle body panel should the hole be cut out of the body panel for access to service the vehicle component.

5. The body panel of claim 4 wherein the plurality of fastener location markings are dimples stamped into the body panel.

6. The body panel of claim 1 wherein the cutting guide feature includes a pair of spaced, generally equidistant ribs integral with the generally planar portion and configured to provide a guide path along which to cut out the access portion.

7. The body panel of claim 1 further comprising:
a second generally planar portion adapted to be located adjacent to and conceal a portion of a second vehicle component;
a second access portion, located within and extending out of plane of the second generally planar portion, and including a second periphery; and
a second cutting guide feature that extends around and is adjacent to the second periphery.

8. The body panel of claim 1 wherein the access portion is raised out of the generally planar portion.

9. The body panel of claim 1 wherein the access portion is depressed into the generally planar portion.

10. The body panel of claim 1 further including a starter hole through the access portion located within or adjacent to the cutting guide feature, and a plug mounted within the starter hole.

11. The body panel of claim 10 wherein the plug is a drain plug.

12. The body panel of claim 1 further including a plurality of fastener location markings spaced around the access portion, and an access hole cover sized to completely cover the access portion and including a corresponding plurality of fastener holes adapted to align with the plurality of fastener location markings.

13. The body panel of claim 1 wherein the body panel is a floor pan.

14. A floor of a vehicle comprising:
a floor pan made of sheet metal;
an access feature, integral with the floor pan, extending out of plane of the floor pan, and including a periphery, wherein the access feature is configured to be located above and to conceal a fuel pump module; and
a cutting guide feature that extends around and is adjacent to the periphery, the cutting guide feature including a pair of spaced, generally equidistant ribs integral with the floor pan and configured to provide a guide path along which to cut out the access feature.

15. The floor pan of claim 14 further including a plurality of fastener location markings spaced around the access feature and being a visual reference that indicates where a plurality of fasteners of a cover would later align with the floor pan should the hole be cut out of the floor pan for access to service the fuel pump module.

16. The floor pan of claim 14 further including a starter hole through a portion of the access feature located within or adjacent to the cutting guide feature, and a plug mounted within the starter hole.

17. A floor of a vehicle comprising:
a floor roan made of sheet metal;
an access feature, integral with the floor pan, extending out of plane of the floor pan, and including a periphery, wherein the access feature is configured to be located above and to conceal a fuel pump module;
a cutting guide feature that extends around and is adjacent to the periphery and is a visual reference that indicates where a hole can be later cut in the floor pan for access to service the concealed fuel pump module;
a plurality of fastener location markings spaced around the access feature, the fastener location markings being dimples recessed into the floor pan;
a starter hole through a portion of the access feature located within or adjacent to the cutting guide feature; and
a plug mounted within the starter hole.

* * * * *